United States Patent [19]
Bakker et al.

[11] 3,916,977
[45] Nov. 4, 1975

[54] METHOD AND AN APPARATUS FOR BUILDING UP SHEET MATERIAL FROM WELDING METAL

[75] Inventors: Rudolf G. Bakker, Oud Beijerland; Hans Klumpes, Maassluis, both of Netherlands

[73] Assignee: De Rotterdamsche Droogok Maatschappij B.V., Roterdam, Netherlands

[22] Filed: Jan. 10, 1974

[21] Appl. No.: 432,323

[30] Foreign Application Priority Data
Jan. 12, 1973  Netherlands........................ 7309521

[52] U.S. Cl. ...................... 164/52; 164/252; 264/33
[51] Int. Cl.² ........................................ B22D 27/02
[58] Field of Search ......... 164/52, 252, 94, 95, 136, 164/334; 425/60, 63, 64; 264/33; 219/73, 126

[56] References Cited
UNITED STATES PATENTS
684,773   10/1901   Anderson........................... 164/94 X
3,558,846   1/1971   Ujiie .................................. 164/52 X
3,749,149   7/1973   Paton et al....................... 164/136 X
3,789,908   2/1974   Ruget.................................... 164/52

FOREIGN PATENTS OR APPLICATIONS
1,103,350   2/1968   United Kingdom................... 164/52

Primary Examiner—Francis S. Husar
Assistant Examiner—John E. Roethel
Attorney, Agent, or Firm—Fleit & Jacobson

[57] ABSTRACT

A method and apparatus for making sheet material using a welding process wherein a plurality of vertically extending, contiguous beads are formed successively from molten weld material continuously supplied by a molding shoe with each bead in fused relationship with the adjacent bead, the molding shoe being arranged for guided, vertical movement adjacent the previously formed bead during the bead forming operation and for movement for each successive bead forming operation to thereby form sheet material from said plurality of beads.

4 Claims, 2 Drawing Figures

METHOD AND AN APPARATUS FOR BUILDING UP SHEET MATERIAL FROM WELDING METAL

This invention relates to a method for building up sheet material from welding metal, according to which welding metal is supplied to and melted down into a melt confined between a suitably shaped molding shoe and the edge of the previously formed sheet material, and according to which the welding shoe is moved along the edge such that the metal solidifying in the welding shoe forms a bead adhering to the edge.

Such a method is known from the British patent specification No. 1,184,837. In this case cylindrical vessels are built up from abutting uninterrupted helical beads. Such a method requires very accurately operating guide means for the welding apparatus, such as the welding head, the shoe and the reels with welding material, since the welding apparatus should be moved very gradually, with the increase of the melted-down material, in the axial direction of the vessel. Furthermore either the welding apparatus must follow a circular path, which renders the control of the guide means still more complicated, or the vessel must be arranged on a rotary table or rollers which for heavy pressure vessels may present special difficulties.

This known method furthermore is a continuous process which means that intermediate maintenance work is difficult to perform at and that there is an increased risk of technical troubles. In addition the continuous supply of welding material may create difficulties.

The afore-mentioned drawbacks are avoided by the method according to the present invention which is characterized in that a multitude of separate parallel substantially vertical and mainly rectilinear beads are welded side by side one against the other, said beads extending over the whole sheet length between two sheet edges. According to the method of the invention the welding apparatus is moved rectilinearly upwards for each bead. Welding the next bead requires a movement only of the welding apparatus slightly to one side, whereupon the next bead may start at the lower end of the previously formed welding bead. Moving the welding apparatus upwards to form a vertical bead presents considerably less problems and may easily be automatically controlled. Moreover, the workpiece is not required to be placed on a turntable or rollers. Maintenance work may be carried out easily between the building up of the individual beads and each time welding material for only one bead has to be supplied.

Hence the invention is particularly suitable for building up cylindrical workpieces, for example heavy steel pressure vessels, from welding metal. This method is characterized in that the individual beads are formed according to the axial substantially rectilinear generating lines of the cylinder sleeve, and that for closing and completing the cylindrical wall the last bead is formed between the first bead or start rod and the previously formed bead.

The invention provides, moreover, an apparatus for performing the afore-mentioned method. In the case of the manufacture of a steel pressure vessel the welding apparatus will describe a circular path in one direction whereas in the other direction lines perpendicular to the plane of the circular path are followed. To this end the apparatus comprises a vertical shaft, at least one horizontal girder, one end of which is rotably mounted about said shaft, at least one welding apparatus being mounted for vertical displacement on a vertical post connected to the free end of the girder.

The invention will now be further explained with reference to the drawings showing an embodiment.

FIG. 3 is a perspective view of a modification of the molding shoe of FIG. 1.

Figure 1:
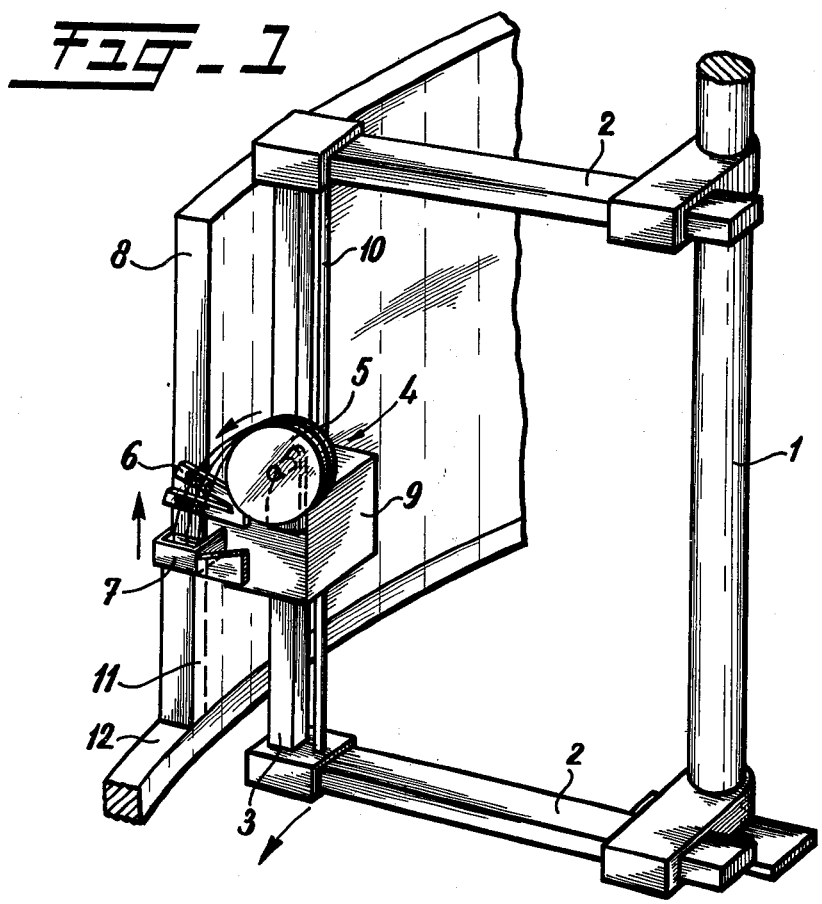
FIG. 1 shows an elevational view in perspective of a welding assembly for the manufacture of cylindrical workpieces from welding metal.

In FIG. 1 reference numeral 1 denotes a central vertically mounted shaft. One end of each of two horizontal girders 2 is mounted on said shaft. These girders may be fastened at their ends for rotation about the shaft 1. However, they may also be fixedly mounted, whilst the shaft 1 itself being rotatable. The girders 2 are interconnected at their other ends by a post 3. The post 3 carries the welding apparatus 4 comprising in the present case of an electroslag process the molding shoe 7, the reels 5 with the strips or wires of material to be melted down and the guide means 6 for the strips or wires. Furthermore there is provided on the movable platform 9 a motor (not shown) for feeding the welding material to the melt in the shoe 7. In addition the welding apparatus 4 comprises devices (not shown) for supplying and transmitting heating current to the strips or wires.

During the welding process the melting bath is formed in the shoe 7. The shoe 7 is moved upwards in the direction of the arrow 1 along with the platform 9, starting from the start ring 12, for example with the aid of the worm drive 10. The material solidifying in the lower part of the shoe 7 forms the new bead 11 the solidified metal of which is fused with the edge 8 of sheet material already formed. The first bead formed in producing the sheet material of FIG. 1 is referred to as a "start rod" and is identified by the numeral 14. Although the same method and substantially the same apparatus is used to form the start rod 14, the start rod required a modified molding shoe since there is no preceeding bead to build on. FIG. 3 shows such a shoe and is identified by the numeral 7' being closed on all sides by side walls rather than on just those sides as in shoe 7. The girders 2 are then rotated in the direction of the arrow P to index the welding apparatus 4 so that next successive bead forming operation can be performed. The thickness of the sheet material to be manufactured with the apparatus and method according to the invention may lie between ±255 mm and some hundreds of mm. The width of the bead in the welding apparatus may thereby amount to between 20 and 60 mm and the speed of rise of the welding shoe may in general be between 1 and 4 metres per hour.

Like in the case of the normal multilayer welding process the molten metal can be subjected to a predetermined heat treatment by a suitable selection of the welding parameters, such as input of energy, dimensions of the bead etc. By mounting a spraying device under the welding head the cooling rate may also be controlled and thus the material properties may be enhanced. One may also provide under the welding head an apparatus for surface treatment of the solidified metal.

Figure 2:
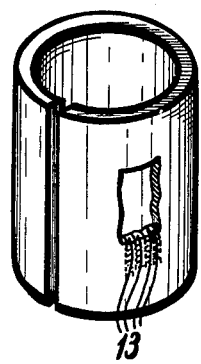
FIG. 2 shows a partly finished cylindrical workpiece the wall of which has been cut open in order to elucidate the invention.

FIG. 2 show a cylindrical workpiece partly cut open, the workpiece having been manufactured according to the method and apparatus of the invention. The reference numeral 13 refers to the various beads. The boundaries of each bead are here shown in full lines but it will be clear that in practice these transitions do not occur in this way since parts of the preceding bead will re-melt upon welding the adjacent bead so that fusion occurs. Hence the workpiece is of a substantially homogeneous structure.

It is obvious that the invention is not restricted to electroslag-welding. One may also apply gas-protected arc-welding. However, the electroslag process is preferred because it results in a higher purity steel in the built-up sheet or pressure vessel and a better refining of the weld during the process.

Neither is the invention restricted to the embodiment shown and discussed in the preceding text. For instance the horizontal girders 2 may extend on either side of the shaft 1 so that simultaneously two diametrically opposed welding apparatuses may be used. Also the length of the girders may be varied so that vessels of various diameters can be manufactured. It is obvious that also other supplements and additions are possible without departing from the scope of the invention.

What we claim is:

1. A method of making sheet material from a plurality of vertically extending, contiguous beads comprising the steps of, providing a molding shoe having side walls partially defining the cross-sectional shape of a bead to be formed, positioning said molding shoe adjacent the vertical side edge of a previously formed bead with said mold shoe side walls and said bead vertical edge completely defining the cross-sectional shape of a bead to be formed, supplying a molten weld metal to said shoe, moving said molding shoe vertically upward along said bead vertical edge while performing said metal supplying step to form a successive, vertically extending bead in fused relationship with said previously formed bead and successively performing said bead forming steps to form sheet material of a selected length from a plurality of said beads.

2. A method in accordance with claim 1 wherein said successive bead forming steps are performed along an arcuate path for eventual fusing engagement between the first and last beads formed to form said sheet material into a workpiece of cylindrical cross-sectional shape.

3. A method in accordance with claim 1 including the step of providing a supplementary molding shoe having side walls completely defining the cross-sectional shape of a bead to be formed, supplying molten weld metal to said supplementary molding shoe, moving said supplementary shoe vertically upward while performing said metal supplying step to form a vertically extending rod constituting the first bead of said plurality of beads forming said sheet material.

4. An apparatus for making sheet material from a plurality of vertically extending, contiguous beads comprising, in combination, welding means including a molding shoe having side walls partially defining the cross-sectional shape of a bead to be formed and means for supplying molten welding metal to said shoe, a vertically extending shaft, at least one horizontally extending girder rotatably mounted at one end on said shaft, means for mounting said welding means on the other end of said girder for vertical movement with said molding shoe adjacent the vertical side edge of a previously formed bead with said mold shoe side walls and said bead vertical side edge completely defining the cross-sectional shape of a bead to be formed, said molten metal being supplied by said supplying means to said molding shoe during the vertical movement of said welding means to form a vertically extending bead in fused relationship with said previously formed bead and said girder being arranged for intermittent, indexing rotation to successively form a plurality of said beads in contiguous, fused relationship forming said sheet material.

* * * * *